Aug. 14, 1956     R. W. KENNEY     2,758,717
CONTROL FOR SEPARATOR
Filed May 31, 1952     3 Sheets-Sheet 1
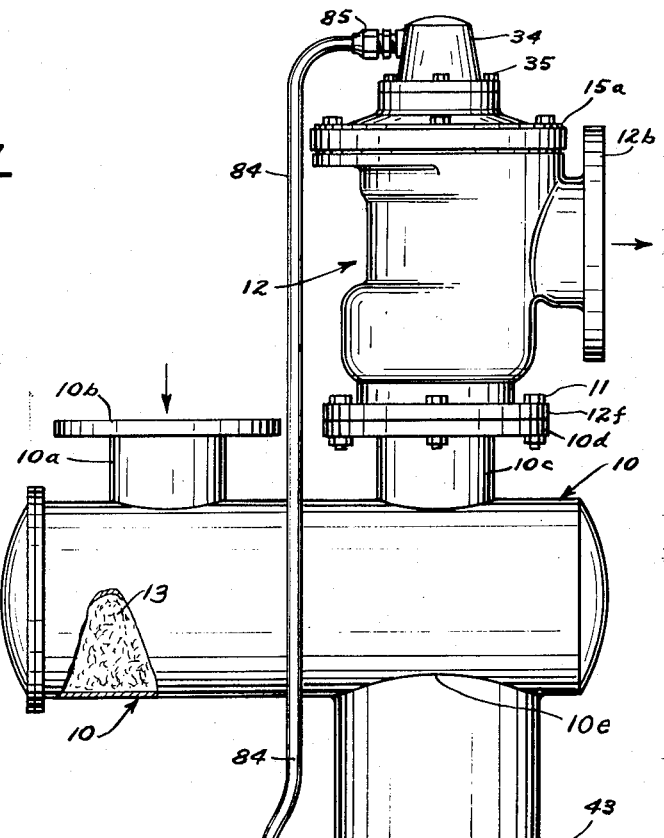
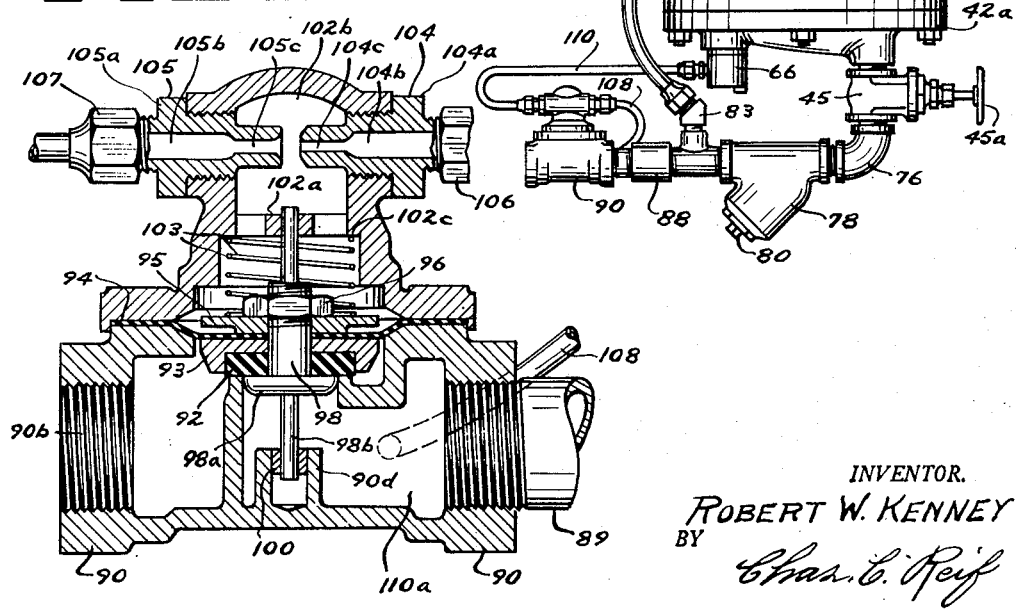
INVENTOR.
ROBERT W. KENNEY
BY
Chas. C. Reif
ATTORNEY

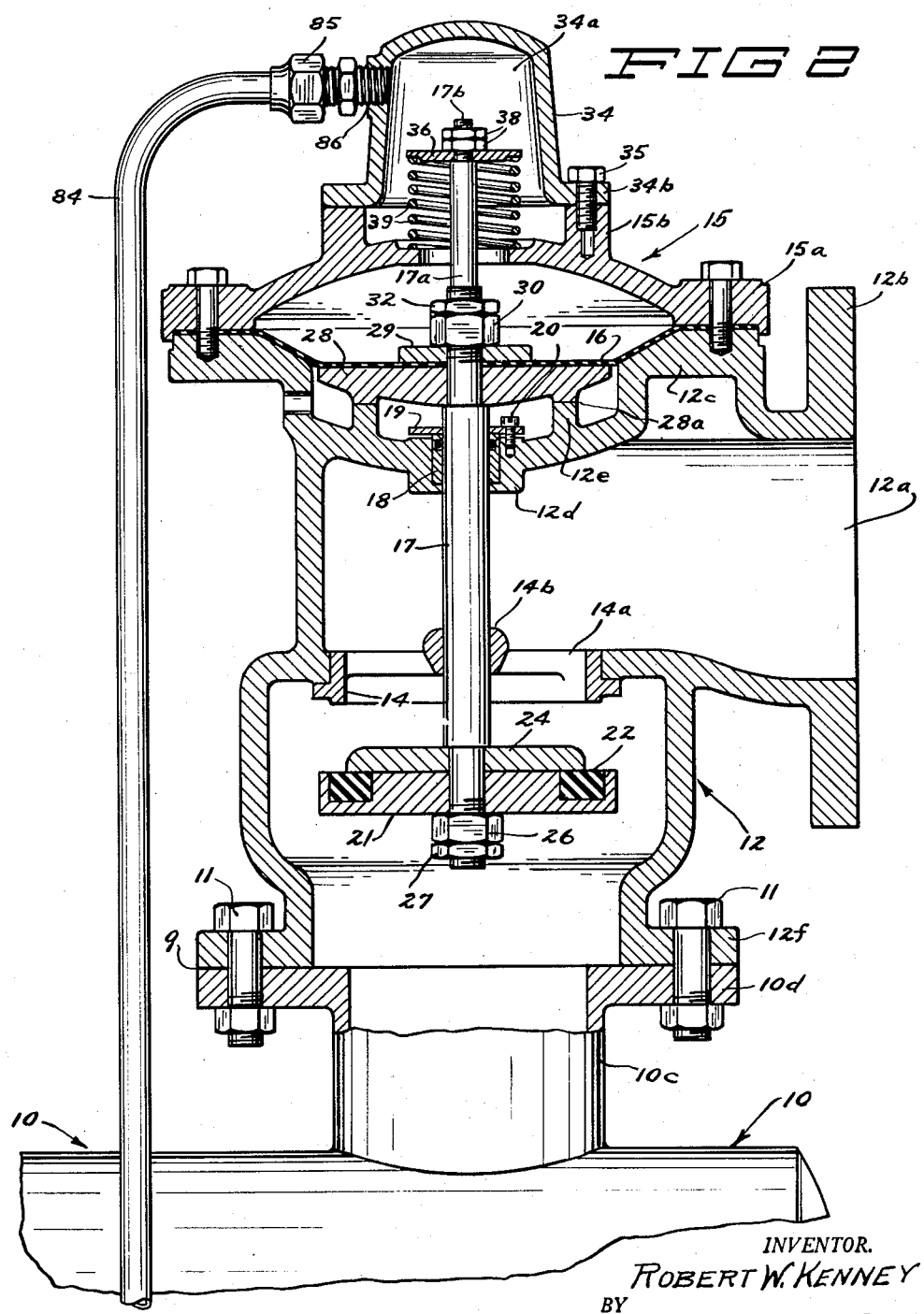

Aug. 14, 1956  R. W. KENNEY  2,758,717
CONTROL FOR SEPARATOR
Filed May 31, 1952  3 Sheets-Sheet 3
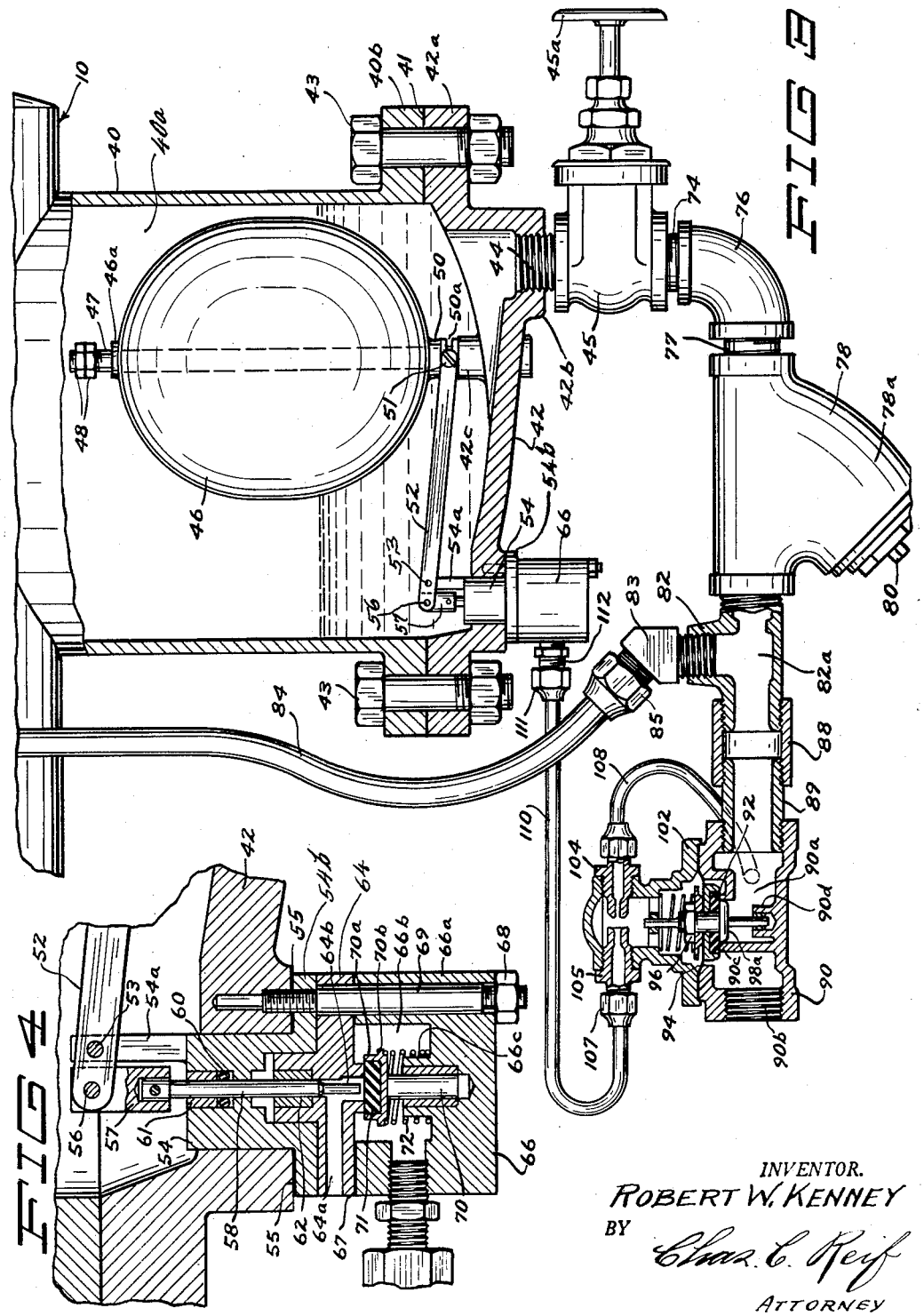
INVENTOR.
ROBERT W. KENNEY
BY
Chas. E. Reif
ATTORNEY

United States Patent Office 2,758,717
Patented Aug. 14, 1956

2,758,717

CONTROL FOR SEPARATOR

Robert W. Kenney, South Pasadena, Calif., assignor to Stanley G. Harwood, South Pasadena, Calif.

Application May 31, 1952, Serial No. 290,899

1 Claim. (Cl. 210—54)

This invention relates to a control system for controlling a separator or similar device involving liquid under pressure and which is located at a distance from the source of such pressure. Such source of pressure would often be a pump. While various types of separators might be controlled, in the embodiment of the invention disclosed a separator for removing water from a hydrocarbon, such as gasoline, is shown. While such separators might be variously constructed, one common form consists of a tank filled with or containing a material for separating water from a hydrocarbon, such as excelsior. Said tank has inlet and outlet openings and said outlet opening is controlled by a valve.

It is an object of this invention to provide a control for a separator for separating water from a hydrocarbon, such as gasoline, which comprises a water chamber for the separated water and float operated means for discharging said water under certain water level conditions.

It is a further object of the invention to provide a control device for a separator having a chamber for a separated liquid, a drain outlet for said chamber and pressure operated means for causing a discharge of said separated liquid actuated by a float in said chamber.

It is also an object of this invention to provide a control device for a separator comprising a chamber for a separated liquid, a discharge passage leading from said chamber, a valve for opening and closing said discharge passage, means for actuating said valve including a pressure chamber and a float controlled mechanism in said first mentioned chamber for varying the pressure in said pressure chamber to move said valve to open or close said discharge passage.

It is still another object of the invention to provide such a device as set forth in the preceding paragraph wherein said last mentioned means includes an ejector for varying the pressure in said pressure chamber and a conduit connected to said outlet passage and one member of said ejector for supplying liquid to said ejector.

It is still another object of the invention to provide such a device as set forth in the two preceding paragraphs, together with a valve for controlling a drain outlet from said discharge passage, a valve for said drain outlet, means urging said last mentioned valve to closed position, and a conduit connected to said last mentioned pressure chamber and to the other part of said ejector, said last mentioned valve being movable in one direction by a float mechanism comprising a float in said first mentioned chamber.

These and other objects and advantages of the invention will be fully set forth in the following description made in connection with the accompanying drawings in which like reference characters refer to similar parts throughout the several views and in which:

Fig. 1 is a view in side elevation of the separator and control means therefor;

Fig. 2 is a central vertical section through the top portion of the mechanism shown in Fig. 1 in a plane parallel to the plane of the drawing;

Fig. 3 is a vertical section through the remainder of the structure shown in Fig. 1 taken on a plane parallel to the plane of the drawing, a small part being shown in side elevation;

Fig. 4 is a central vertical section through a portion of a float operated mechanism taken on a plane parallel to the plane of the drawing; and Fig. 5 is a vertical section showing a portion of the structure shown in Fig. 3 shown on an enlarged scale.

Referring to the drawings, a separator is shown comprising a tank 10 having an inlet conduit 10a provided with a flange 10b to which another conduit will be connected. Conduit 10a comprises the inlet passage for tank 10. Tank 10 also has an outlet conduit 10c having an outlet passage therethrough for tank 10 and also having a flange 10d to which is connected by the headed and nutted bolts 11 a flange 12f of a valve housing 12. Disposed in said tank 10 is material 13 for separating water from a hydrocarbon. While various types of materials may be used, the type disclosed in the embodiment of the invention here illustrated is excelsior. A gasket 9 is shown disposed between flanges 10d and 12f. Valve housing 12 has an outlet passage 12a surrounded at its end by a flange 12b to which a suitable conduit will be connected. Valve housing 12 has an inlet passage 14a comprising openings through a spider member 14 threaded into valve housing 12 and having a central bearing 14b. Valve housing 12 has a portion 12c with a circumferential flat surface to which is secured a member 15 having a circumferential portion 15a fitting on said surface. A diaphragm 16 of flexible material is clamped between portion 15a and portion 12c. A rod 17 is movable in bearing 14b and in a bushing 18 in a bearing 12d formed in valve housing 12. A plate 19 is shown engaging the top of bushing 18 and connected to bearing 12d by a headed bolt 20. Rod 17 at its lower end has a reduced portion on which is mounted a valve plate 21 having an annular groove in its upper side containing a member 22 of yielding material, such as packing material or a rubber compound. Valve plate 21 is surmounted by a plate 24 on said reduced portion and engages the shoulder formed by said reduced portion. Plates 21 and 24 are held in place by a nut 26 threaded on the lower end of said reduced portion and engaged by a lock nut 27 also threaded on said reduced portion. Diaphragm 16 is engaged at its lower side by a plate 28 and a plate 29 engages the top of said diaphragm at its central portion. Said diaphragm 16 is clamped between plates 28 and 29 by a nut 30 threaded on a reduced portion of rod 17, a lock nut 32 also being threaded on said portion. Plate 28 engages the shoulder formed by said last mentioned reduced portion. Plate 28 has a depending annular flange 28a adapted to engage a similar upstanding flange 12e on member 12. Member 15 has a chamber therein above diaphragm 16 which has a central opening at its top communicating with a chamber 34a in a casing 34 having a flange 34b engaging an upstanding annular flange 15b. Member 34 is connected to member 15 by a plurality of circumferentially spaced headed bolts 35. Rod 17 has an upper reduced portion 17a which in turn has a terminal threaded reduced portion 17b forming a shoulder against which a plate 36 seats, the same being disposed on reduced portion 17b and held against said shoulder by nuts 38 threaded on portion 17b. Plate 36 has a depending central portion surrounded by the upper end of a compression coiled spring 39 engaging the bottom of plate 36 at its upper end and engaging a central flange on member 15 at its lower end. It will be seen that said spring 39 urges valve 21—22 to a closed position.

A cylindrical casing 40 having a chamber 40a therein depends from the lower side of tank 10 and communicates therewith through outlet 10e, the same having at its lower end an annular flange 40b. Flange 40b engages a flange 42a on a member 42, said flanges 40b and 42a being connected by a plurality of circumferentially spaced headed and nutted bolts 43. A gasket 41 is shown as disposed between flanges 40b and 42a. Member 42 has an outlet or discharge passage extending through a depending lug 42b which is connected by a coupling 44 to a shutoff valve 45 having an operating hand wheel 45a. A float 46 is disposed in chamber 40a and has extending centrally therethrough a rod 47 having a pair of nuts 48 threaded on its upper end. Float 46 has a boss 46a at its upper end surrounding rod 47 and adapted to be engaged by the lower one of nuts 48. Float 46 has a member 50 at its lower side movably secured to rod 47, the same having an annular groove 50a formed therein into which extend the ends of headed screws 51 carried at the sides of a fork at one end of a lever 52. The bottom of member 50 is adapted to engage the top of a lug 42c upstanding from the inner surface of member 42. Lever 52 is fulcrumed on a pivot 53 carried in a bracket 54a secured to a member 54 secured in an opening through the bottom of member 42. Member 54 is provided with a flange 54b engaging the bottom of a gasket 55 disposed between a lug on member 42 and said flange. The end of lever 52 is pivotally connected by a pivot 56 to a member 57 secured to the upper end of a rod 58 extending through a central bore in member 54 and through packing material 60 in a recess in the upper end of member 54, which material is held in place by a gland 61 secured in member 54. Rod 58 also passes through a bushing 62 formed in a member 64 having a central upstanding cylindrical portion fitting in a recess in the bottom of member 54. Member 64 has a laterally extending drain passage 64a which communicates with a central passage 64b extending through the bottom of member 64. A member 66 has an upper annular portion 66a which engages a gasket 67 disposed between the same and the bottom of member 64. Members 54, 64 and 66 are clamped and held in position by one or more studs 69 having their upper ends threaded into member 42 and having reduced threaded portions at their lower ends on which are disposed nuts 68 engaging the bottom of member 66. Member 66 has a chamber 66b therein and a lug 66c extends upwardly in said chamber. Lug 66c is bored to receive a rod 70 having at its upper end a cup-shaped portion 70a surrounded by an annular flange 70b. Said portion 70a has therein a member 71 of yielding or resilient material and members 70 and 71 constitute a valve for closing passage 64b and thus passage 64a. A compression coiled spring 72 surrounds lug 66c, the same engaging the bottom of flange 70b at its upper end and engaging member 66 at its lower end. It will be seen that spring 72 urges valve 70—71 to closed position.

Valve 45 is connected by a suitable coupling 74 to an elbow 76 in turn connected by a suitable coupling 77 to a strainer device 78. Said coupling 74, elbow 76, coupling 77 and strainer device 78 form a portion of said last mentioned discharge passage. Strainer device 78 has a downwardly extending portion 78a having a discharge outlet which is normally closed by a plug 80. A member 82 is threaded into the other end of strainer 78, the same having a chamber 82a therein. Chamber 82a has a passage extending upwardly therefrom into which is threaded a coupling member 83 and a conduit 84 is connected by a coupling member 85 to member 83 so that conduit 84 communicates with chamber 82a. Conduit 84 is suitably connected by a coupling 85 to a nipple 86 communicating with chamber 34a in member 34. Member 82 is connected at its other end to a coupling member 88.

Member 88 is connected by a suitable nipple 89 to a member 90 having therein a pressure chamber 90a. Member 90a has an interiorly threaded discharge outlet passage 90b at its other end adapted to be connected to a discharge conduit and said member 90 has communication with said last mentioned discharge passage. Member 90 has an upstanding annular flange 90c arranged to be engaged by a member 92 of yielding or resilient material carried in a cup-shaped member 93, the upper side of which engages the bottom of a diaphragm 94 of suitable flexible material. A plate 95 has a central portion engaging the central portion of the top of diaphragm 94, and members 93 and 95 are clamped to diaphragm 94 by a nut 96 engaging the top of plate 95 and threaded on a rod 98 extending through members 93, 94 and 95 and having a collar 98a thereon engaging the bottom of member 92. Rod 98 has a lower reduced portion 98b adapted to enter a bushing 100 secured in a recess in a lug 90d upstanding from the inner wall of member 90. Rod 98 at its upper portion is reduced and extends through a bearing 102a carried in a member 102. Member 102 has a lower flange, the bottom surface of which mates with an upper annular surface on member 90, and diaphragm 94 is clamped between members 102 and 90. Members 90 and 102 will be suitably held together by means not shown. Member 102 has a pressure chamber 102b therein and a shoulder 102c is formed in member 102 against which bears the upper end of a coiled compression spring 103, the lower end of which engages the top of plate 95. Member 102 has bosses at each end and similar members 104 and 105 are threaded into said bosses, the same having portions 104a and 105a respectively engaging the outer ends of said bosses. Members 104 and 105 have reduced nozzle-like portions at their inner ends spaced a short distance from each other. Said members 104 and 105 have respectively passages 104b and 105b extending from their outer ends which communicate with smaller passages 104c and 105c extending to the inner ends of said members. Members 104 and 105 have projecting portions at their outer ends respectively exteriorly threaded to receive couplings 106 and 107. Coupling 106 connects member 104 to a conduit 108 which extends to and communicates with chamber 90a in member 90. Coupling 107 connects member 105 to a conduit 110 which is connected to a coupling 111 in turn connected to a nipple 112 secured in member 66 and communicating with chamber 66b.

In operation, the hydrocarbon, such as gasoline, will be pumped into the separator tank 10 through the inlet conduit 10a and the liquid in said tank will be under the pressure of the pump supplying it, which pump will be located at some distance from the separator. The water in the hydrocarbon is separated from the hydrocarbon by the excelsior in tank 10 and said water drains down into chamber 40a. With valve 92 closed, the water in chamber 40a will flow through valve 45, now open, and into the chamber 82a and thus into members 89 and 90. The water cannot pass out because valve 92, as stated, is closed. Water under pressure will therefore fill conduit 84 and chamber 34a and the chamber above diaphragm 16. This pressure holds diaphragm 16 down and valve 21—22 is thus held in open position. The hydrocarbon can thus pass out through discharge passage 12a. In Fig. 3 water is shown in chamber 40a in insufficient quantity to raise float 46. Float 46 is thus resting on lug 42c. Lever 52 is thus raised at its short end and rod 58 is in raised position, thus enabling spring 72 to maintain valve 71 in closed position. As water accumulates and rises in chamber 40a, float 46 will be lifted and will move up with the rise in the water level. Lever 52 will then move rod 58 downwardly and will push valve 71 downwardly against the pressure of spring 72. Water can now flow from chamber 90a into conduit 108 and through member 104. Members 104 and 105 with chamber 102b form an ejector. The water flows from chamber 102b, through member 105, through conduit 110 and into chamber 66b, thence through passages 64b and 64a. As float 46 continues to rise, valve 71 will be opened farther and the volume of water flowing to passage 64a will increase. The ejector formed by members 104 and 105 will now function and pressure will be lowered in chamber 102b. This pressure will be lowered sufficiently to enable the pressure in chamber 90a to move diaphragm 94 upwardly, thus opening valve 92. The water can now be discharged through valve 92 and out of the open end of member 90. When float 46 reaches its upper positions, the volume of water flowing through member 82 will greatly increase. Member 82 with the passages at each end thereof with chamber 82a forms an ejector. When the flow of water reaches a predetermined volume, this ejector begins to function and the pressure in chamber 82a is materially lowered. Pressure is thus lowered in chamber 34a as the lowered pressure will extend through conduit 84. This lowered pressure in chamber 34a, plus the pressure of spring 39, permits said spring to raise rod 17 and close valve 22. The water will continue to drain through conduit 110 until float 46 descends to the position shown. Spring 72 will then close valve 71 and the flow of water through conduit 110 will then be stopped. With the flow of liquid stopped in conduit 110, pressure builds up in chamber 102b which forces diaphragm 94 downwardly closing valve 92. When valve 92 is closed, pressure is built up in chamber 90a and 82c forcing liquid through conduit 84 and into the chamber 34a. The pressure thus built up in chamber 34a will again force rod 17 downwardly against the pressure of spring 38 and valve 22 will be opened. The parts are thus again brought to the position shown.

It will thus be seen that the discharge of water is controlled by valve 92 which in turn is controlled by valve 70—71 which is actuated by the movement of float 46. The discharge of fuel through outlet 12a is controlled by valve 21—22 which is affected by the degree of pressure in chamber 34a and said last mentioned pressure is controlled by the action of valve 92 and by the ejectors formed at each end of chamber 82a.

From the above description it will be seen that I have provided a rather simple and quite efficient automatic control for periodically discharging the water which accumulates in chamber 40a. The separator, as stated, can be located quite a distance from the pump or source of pressure supplying the gasoline and no operator will be necessary to effect a discharge of the water from chamber 40a. The parts of the device are made for easy assembly and all the parts are quite accessible for adjustment or repair.

The device has been amply demonstrated in actual practice and found to be very successful and efficient.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claim.

What is claimed is:

A control device for a separator, which separator comprises a vessel having inlet and outlet passages and to which a hydrocarbon liquid is supplied under pressure, said vessel containing means for separating water from said hydrocarbon liquid and having a second outlet through which said water passes having in combination, a valve for opening and closing said first mentioned outlet passage, a chamber below said vessel and second mentioned outlet passage for receiving said separated water, a float in said chamber, a discharge passage for said chamber, a drain passage, means for connecting said discharge passage and said drain passage, said means comprising a pressure chamber, spaced portions in said pressure chamber forming therewith an ejector, said discharge passage having a discharge outlet, a second valve closing said discharge outlet, means actuated by the pressure in said pressure chamber for moving said second valve to open position, means for urging said second valve to closed position, a third valve for shutting off or effecting communication between said discharge passage and said drain passage, means operated by said float for moving said third valve to effect said communication and permit the discharge of water through said drain passage, said ejector subsequently acting to reduce pressure in said pressure chamber and permit said second mentioned means to open said second valve and permit the flow of water through said discharge outlet, said discharge passage having a second pressure chamber therein and spaced portions in said second pressure chamber forming therewith a second ejector, a third pressure chamber adjacent said first mentioned valve, means actuated by the pressure in said third pressure chamber for holding said first mentioned valve in open position, means urging said first mentioned valve to closed position and a conduit connecting said second pressure chamber and said third pressure chamber, said second ejector acting upon sufficient flow through said discharge passage to reduce the pressure in said second pressure chamber and thus through said last mentioned conduit to reduce pressure in said third pressure chamber and permitting said last mentioned means to close said first mentioned valve.

References Cited in the file of this patent

UNITED STATES PATENTS

| | | |
|---|---|---|
| 2,211,282 | McKeever | Aug. 13, 1940 |
| 2,412,841 | Spangler | Dec. 17, 1946 |
| 2,452,615 | Thomson | Nov. 2, 1948 |
| 2,525,154 | Taylor | Oct. 10, 1950 |
| 2,609,099 | Griswold | Sept. 2, 1952 |
| 2,664,170 | Walker et al. | Dec. 29, 1953 |